(12) United States Patent
Wilska et al.

(10) Patent No.: US 6,427,078 B1
(45) Date of Patent: Jul. 30, 2002

(54) DEVICE FOR PERSONAL COMMUNICATIONS, DATA COLLECTION AND DATA PROCESSING, AND A CIRCUIT CARD

(75) Inventors: Kari-Pekka Wilska, Salo; Reijo Paajanen, Tampere; Mikko Terho, Tampere; Jari Hamalainen, Tampere, all of (FI)

(73) Assignee: Nokia Mobile Phones Ltd., Salo (FI)

( * ) Notice: Subject to any disclaimer, the term of this patent is extended or adjusted under 35 U.S.C. 154(b) by 0 days.

(21) Appl. No.: 08/807,322

(22) Filed: Feb. 27, 1997

Related U.S. Application Data (63) Continuation of application No. 08/444,224, filed on May 18, 1995.

(30) Foreign Application Priority Data

Jun. 12, 1995 (FI) .................................................. 942334

(51) Int. Cl.⁷ ................................................. H04B 1/38
(52) U.S. Cl. ........................ 455/550; 455/556; 455/557; 455/558; 348/14.02; 348/231; 348/552
(58) Field of Search .......................... 455/90, 403, 550, 455/556, 557, 558, 566, 575; 348/14, 231, 552, 14.01, 14.02, 14.13, 14.14; 395/800.14

(56) References Cited

U.S. PATENT DOCUMENTS

| | | | |
|---|---|---|---|
| 4,903,222 A | | 2/1990 | Carter et al. ................. 364/708 |
| 5,189,632 A | * | 2/1993 | Paajanen et al. ........ 364/705.05 |
| 5,272,598 A | | 12/1993 | Kobayashi et al. .......... 361/686 |
| 5,404,580 A | * | 4/1995 | Simpson et al. .............. 455/89 |
| 5,438,359 A | * | 8/1995 | Aoki ........................... 348/207 |

FOREIGN PATENT DOCUMENTS

| | | | |
|---|---|---|---|
| EP | 0 526 802 A2 | 2/1993 | |
| JP | 63151283 A | 6/1988 | |
| JP | 1160286 A | 6/1989 | |
| JP | 4170881 A | 6/1992 | |
| JP | 4295886 | 10/1992 | |
| JP | 6-70314 | 3/1994 | |
| WO | WO92/09169 | 5/1992 | ............ H04N/5/30 |
| WO | WO 94/14274 | 6/1994 | |
| WO | 9607269 A1 * | 3/1996 | |

OTHER PUBLICATIONS

Reimer, John, "Memories in My Pocket", Byte, Feb. 1991, pp. 251, 252, 254–256, 258.
Patent Abstracts of Japan, vol. 17, No. 107 (P–1496) (5736) Mar. 4, 1993, JP–A–4–295886.
Patent Abstracts of Japan, vol. 18, No. 320 (E–1563) (6660) Jun. 17, 1994, JP–A–6–70314.
Patent Abstract published in UK, "Lights Camera Multimedia", Network, pp. 56–58, 60, Nov. 1993, K. Young.

* cited by examiner

Primary Examiner—Nay Maung
(74) Attorney, Agent, or Firm—Perman & Green, LLP (57) ABSTRACT

The object of the invention is a device for personal communication, data collection and data processing, which is a small-sized, portable and hand-held work station comprising a data processing unit (2); a display (9); a user interface (10, 11); a number of peripheral device interfaces (12, 17); at least one memory unit (13); a power source, preferably a battery (3); and an application software. According to the invention the device also comprises a camera unit (14). The camera unit (14) comprises a camera (14a), preferably a semiconductor camera, and optics (14b) connected thereto, which are placed in the housing (1) of the device. Alternatively, the camera unit (14) is fitted on a PCMCIA card (15) which can be connected to the PCMCIA card slot (16) of the device. An object of the invention is also a PCMCIA card (15) provided with a camera unit (14).

76 Claims, 3 Drawing Sheets

DEVICE FOR PERSONAL COMMUNICATIONS, DATA COLLECTION AND DATA PROCESSING, AND A CIRCUIT CARD

This is a continuation of copending application Ser. No. 08/444,224 filed on May 18, 1995.

BACKGROUND OF THE INVENTION

The object of the invention is a device according to the introductory part of claim 1 for personal communication, data collection and data processing. The device consists of a small-sized housing comprising a data processing unit which contains a data processor with peripheral circuits and memory units, a display, a user interface, a number of peripheral device interfaces, a power source, preferably a battery, and application software.

Another object of the invention is a circuit card according to the introduction of claim 8 which can be fitted to the card slot arranged in connection with a device intended for personal communication, data collection and processing, in particular.

Personal communication devices and/or mobile organisers, such as notebook computers and the like, known from before, are small, light-weight, portable and hand-held or laptop workstations. A number of accessories and application programs which offer service functions can be installed in such personal devices, when necessary A such notebook computer is disclosed in international patent application WO-93/14458.

The notebook computer can be equipped with an electronic scanner by means of which both text and figures can be read into the memory of the computer. This helps to eliminate the drawbacks of small keyboards, in particular. Data required in many connections, such as contact information included in business cards, can be read into the memory of the computer. However, electronic scanners comprise fine-mechanical parts which wear and may cause problems. Especially paper feeding arrangements fitted in small notebook computers are problematic.

The general purpose of this invention is to provide a new device for personal communication, data collection and processing which improves communication especially between a user and the device. A special purpose of the invention is. to provide a device for personal communication, data collection and processing which makes it possible to collect data efficiently and to communicate with the environment. This is accomplished by the characteristic features of the invention, disclosed in appended claims 1–7.

Another purpose of the Invention is to provide a new interface card which makes it possible to improve the data collection systems of small microcomputers, in particular. This is accomplished by the characteristic features of the invention, disclosed in claim 8.

An advantage of the invention is that one and the same device, personal communications, data collection and processing comprises an easy-to-use data collection device, efficient data processing equipment (programs) and data transmission equipment.

BRIEF DESCRIPTION OF THE DRAWINGS

The invention is described in the following in more detail with reference to the appended drawings in which.

DETAILED DESCRIPTION OF THE INVENTION

Figure 1:
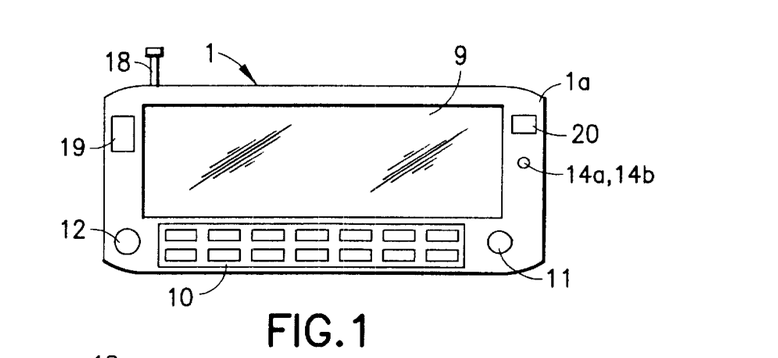
FIG. 1 shows a device according to the invention for personal communication, data collection and processing, in which the data collection device is implemented by means of an integrated camera unit.
Figure 2:
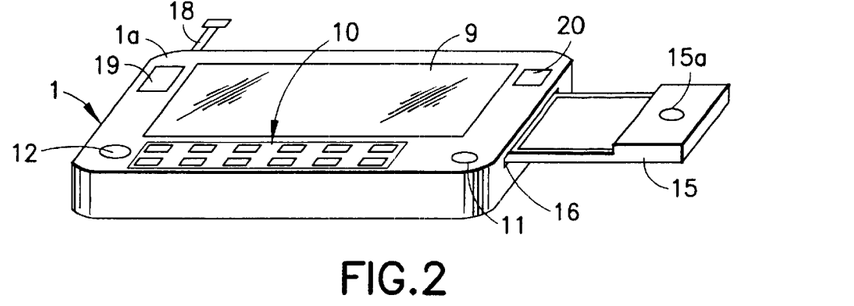
FIG. 2 shows another device according to the invention for personal communication, data collection and processing, in which the data collection device is implemented by a camera unit arranged in a PCMCIA card.

FIGS. 1 and 2 show two application examples of the device according to the invention for personal communication. data collection and processing. A block diagram of such device is shown in general form in FIG. 3. The device according to the invention is called a notebook computer in the following.

A notebook computer is a small, portable work station. The external dimensions of its housing 1 are preferably in the order of 170 mm×85 mm×30 mm (length×width×height) and the weight 1000 g at the most, preferably 800 g or less. The device is preferably arranged to operate by one or more batteries 3 (FIG. 3) which are fitted replaceably inside housing 1.

The notebook computer comprises data processing unit 2 (FIG. 3) which is preferably arranged on one semiconductor chip. Data processing unit 2 comprises processor 4 which is preferably a low power RISC processor. Data processing unit 2 further comprises input/output controller 5, display controller 6, memory controller 7 and cellular mobile phone controller 8. In addition, data processing unit 2 comprises connection buses and cables between different controllers and the data processor which are not separately shown in the block diagram of FIG. 3.

The notebook computer further comprises display 9 which is arranged, in the application examples of FIGS. 1 and 2, fixedly in connection with housing 1 on large side 1$a$ thereof which is essentially of a rectangular shape. Display 9 is provided, for example, by a liquid crystal display, The resolution of which is at least 640×200 pixels$^2$ and the dimensions in the order of 130 mm×70 mm. Display 9 is connected to display controller 6.

Figure 3:
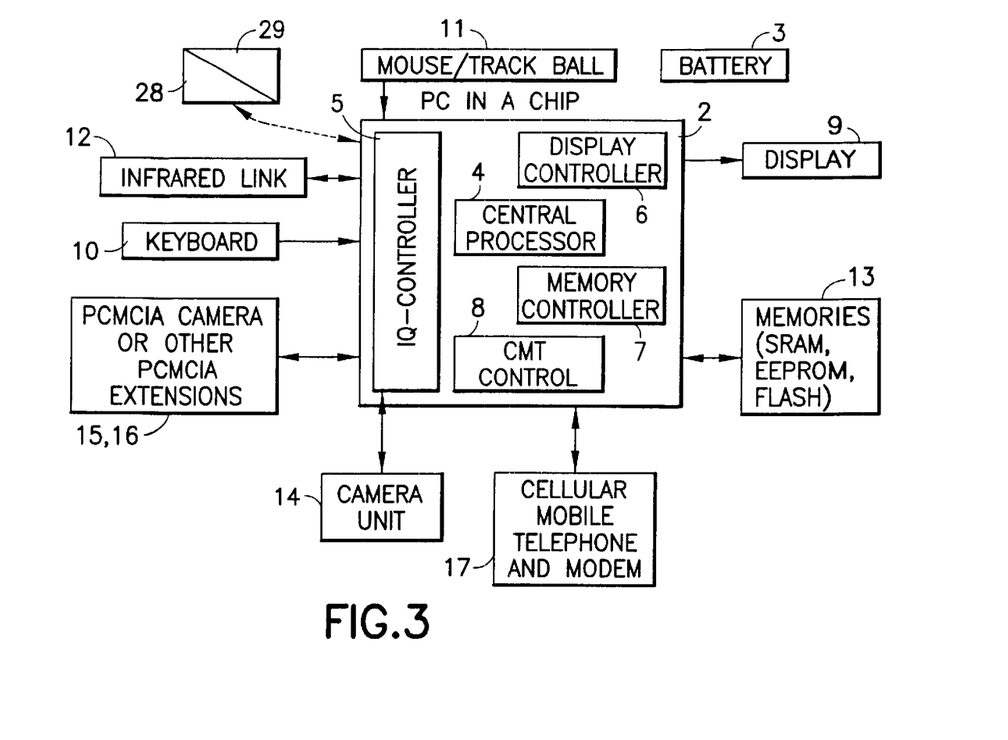
FIG. 3 shows a device for personal communication, data collection and processing, in the form of a block diagram.

The notebook computer also comprises keyboard 10 and/or mouse/track ball 11 as a user interface. Keyboard 10 and track ball 11 in this application are arranged fixedly to the notebook computer in the vicinity of display 9. The notebook computer preferably comprises Infrared link 12 by means of which the connection with peripheral devices, such as a printer, another microcomputer or the like is provided. Keyboard 10, mouse/track ball 11 and infrared link 12 are connected to input/output controller 5, as shown in FIG. 3.

The notebook computer further comprises one or more memory units 13. The memory unit can be implemented by means of SRAM, EEPROM and/or FLASH memory circuits, for instance. The operating system and preferably at least part of the application programs are recorded in memory unit 13. In addition, memory unit 13 contains a sufficient amount of read-write memory space.

The notebook computer further comprises a data collection device which is Implemented by means of a camera unit. The embodiment of FIG. 1 represents camera unit 14 (FIG. 3) fitted in housing 1 of the notebook computer as a stationary part thereof. In this application, camera 14a of camera unit 14 and related optics 14b are arranged on the same side of the housing as display 9, though a different disposition is also possible. Camera unit 14 is connected via input/output controller 5 to data processing unit 2 (FIG. 3). Camera unit 14, which is represented in the form of a block diagram in FIG. 5, consists of camera arrangement 140 which comprises camera 14a provided with suitable optics 14b, and image processing unit 14c connected to the camera arrangement. This data collection unit can be used to transfer data presented on paper or the like as well as an image taken of the surroundings, for instance of a person, to the notebook computer to be processed further.

Figure 5:
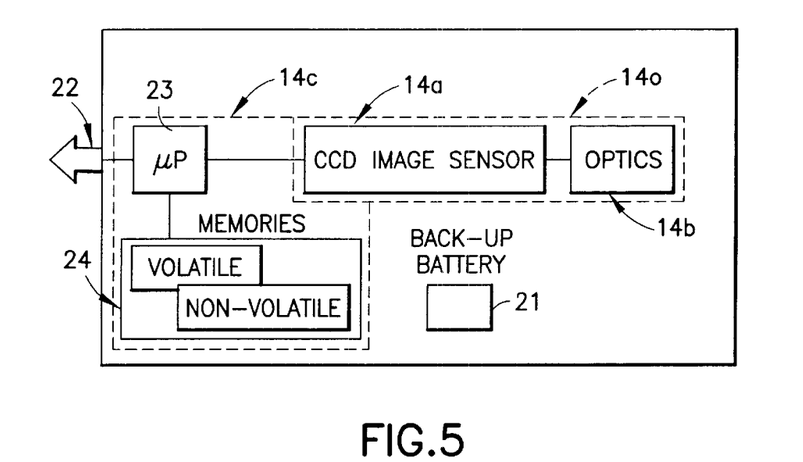
FIG. 5 shows a block diagram of the camera unit.

In the notebook computer application of FIG. 2 camera unit 14 is fitted in a circuit card, preferably in PCMCIA card 15. Camera 14a and optics 14b of camera arrangement 140 are integrated in this card 15 together with their peripheral electronics, i.e., the image processing unit 14c (FIG. 5). The circuit card, i.e., camera card 15, in turn, can be fitted into the card slot, such as PCMCIA card slot 16, of the mobile organiser. Camera 14a of the embodiment of both FIG. 1 and FIG. 2 is implemented as a semiconductor camera, preferably as a small CCD (Charge Coupled Device) camera. The adapter in PCMCIA card slot 16 is connected to input/output controller 5, as illustrated in FIG. 3. It is obvious that other corresponding, applicable PCMCIA cards, which meet the standards drawn up for card slots, can also be fitted into this card slot 16.

The notebook computer further comprises a radiotelephone, i.e., cellular mobile phone unit 17, preferably as an Integrated part thereof. It is connected to cellular mobile phone controller 8 of data processing unit 2 and to receiver/transmitter antenna 18. In the case of a telephone set operating in an analogue cellular network, a modem is preferably connected to cellular mobile phone unit 17. Cellular mobile phone unit 17 is based on the standard cellular mobile phone technology. Both data and speech can be transmitted via integrated cellular mobile phone unit 17. The data transmission properties are based on an analogue modem and the GSM data interface, for instance, the technology of both of them being conventional. For a speech connection, miniature speaker 19 and microphone 20 can be arranged in the housing of notebook computer 1 on both sides of display 9. The notebook computer can then be used in the same way as a conventional hand-held telephone.

An additional part of the notebook computer is software applied for it. It is recorded in memory unit 13. Using the software, the user controls different functions of the mobile organiser as required. The functions related to the notebook computer include, for instance: telephone services which are based on the cellular mobile phone (data transmission and/or speech transmission properties), facsimile services, electronic mail, short message service/SMS, a calendar and scheduler software, a clock with alarm clock functions. camera functions to record images and paper documents, as well as computer i.e., PC interface functions for transferring information to PC applications.

Figure 4:
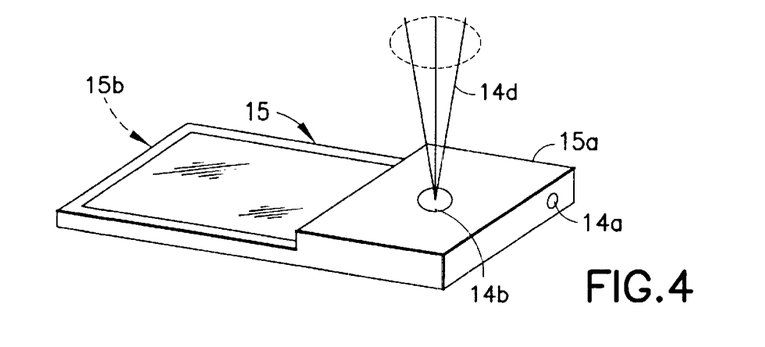
FIG. 4 shows a PCMCIA card, i.e., a PCMCIA camera card comprising a camera unit as an essential part thereof.

Camera unit 14 operating as the data collection device is considered more closely in the following. Camera 14a and optics 14b connected thereto are fitted to PCMCIA card 15 in the camera unit. The Personal Computer Memory Card International Association, i.e., the PCMCIA was formed in order to advance the exchangeability of integrated circuit cards in computers and other electronic devices. Consequently, the PCMCIA cards are standardized cards which are applicable for both memory cards and expansion cards of peripheral circuits, i.e., for input/output cards. Camera card 15 described herein is based on the standard mentioned above in which camera arrangement 140 and peripheral circuits required by it are integrated in the standard card. FIG. 4 shows a physical model of a possible PCMCIA card 15 in which camera unit 14 is fitted in the thickened part 15a of the card. Camera 14a, such as a CCD (Charged Coupled Device) camera, is preferably a camera focused on a fixed distance and it is preferably fitted to the centre part of the enlargement 15a of the card. Camera 14a with its optics 14b is arranged so that the image field 14d of the camera opens up perpendicular to the surface of card 15. Adapters 15b are arranged at the other end of card 15 to connect the card to the PCMCIA card slot 16 in the notebook computer and to the counter connectors in the card slot.

In principle, the structure of both camera card 15 and camera unit 14 conforms to the block diagram shown in FIG. 5. By example, camera card 15 consists of camera arrangement 140 which comprises camera 14a and optics 14b, image processing unit 14c, battery 21 and interface 22 to external systems which in this case is a standard PCMCIA Interface concerning camera card 15. Image processing unit 14c comprises microprocessor 23 and a number of memory units 24. Optics 14b are provided by a suitable lens arrangement, by means of which a sharp image is obtained of the object to be scanned in on the image plane of camera 14a. Camera 14a is preferably implemented as a CCD camera comprising a two-dimensional light-sensitive CCD sensor, the resolution of which is from 250 k pixel as high as to 26.2 Mpixel. Memory units 24 preferably comprise two kinds of memory units: volatile memory units,, such as DRAM and SRAM units used as scratch pad storages, and non-volatile memory units, such as FLASH and EPROM units which are used as base program memories. Power to the PCMCIA card. is supplied via the PCMCIA interface from the notebook computer. Battery 21 is mainly used to ensure that images are maintained in the volatile memory units if the PCMCIA card is detached from the card slot. Battery 21 can be also used for the same purpose in camera unit 14 (FIG. 1) integrated in the notebook computer.

Camera unit 14 functions in the following way, whether it is fixedly integrated to the notebook computer or connectable to the card slot of the notebook computer as camera card 15: a picture of a document or three-dimensional environment taken by camera 14a through optics 14b is transferred to image processing unit 14c and through its microprocessor 23 to memory unit 24, such as RAM. When the user wishes to view the picture thus taken on display 9 of the notebook computer, he/she can do that immediately. The desired image information is read from memory unit 24 by means of microprocessor 23 of camera card 15, and the image information is transmitted to processor 4 of the mobile organiser along PCMCIA interface 22 or a corresponding interface and further to display 9 via display controller 6. Image processing unit 14c processes the image information into a suitable form to be presented to the user by the mobile organiser.

The image information recorded in camera card 15 can be scanned in either by the mobile organiser or by another computer and/or device provided with a PCMCIA interface or the like. It is possible to edit the picture by an external computer and the modified picture can be recorded again in memory unit 24 of camera card 15. By virtue of battery 21, the operation of microprocessor 23 of image processing unit 14c and that of memory unit 24 is assured in all circumstances.

Camera unit 14 comprises a character recognition software which is similar to that used in computers provided with pen interfaces, for instance. Previously known pattern recognition software can be used to recognise graphical objects, After a text and/or an image has been scanned in the notebook computer, the user can start an application program to process the data to suit his/her purposes.

Figure 6:
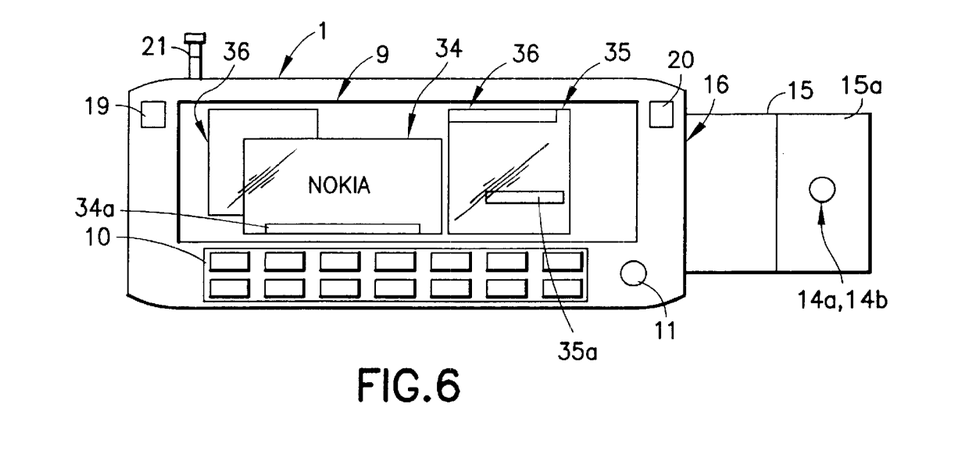
FIG. 6 shows a device according to the invention, whose display illustrates an example of an application related to the camera unit.

The application program of camera unit 14 functions, e.g., in the following way: business card handler application 36 (FIG. 6) is selected for the application program. The user first scans in the business card by camera 14a, then the picture of the business card and the information contained in it are transferred from camera unit 14 to memory unit 13 of the notebook. computer and via data processing unit 2 to display 9. After the scanned image 34 of the business card is visible on display 9, the user opens business card handler application 36 and key fields 35 of this application appear on display 9, as illustrated in FIG. 6. Key fields 35 have been recorded in the database. The user selects a suitable field 34a from the business card and drops it to the correct key field 35a of the business card handler application, The selection and dropping are made by means of the mouse or track ball 11. The fields required are selected from picture 34 of the business card and dropped to corresponding fields 35 of business card handler application 36. After the above-described procedures have been carried out, the information contained in the business card can be used as address directory for letters, as telephone memo information or for other suitable purposes.

Other kinds of information can also be scanned in the notebook computer by means of camera unit 14. The document can be a note written on a paper by hand, for instance. The user scans in the document, stores it in the memory unit of the notebook computer and processes it as required. A graphics handler software can be arranged to function with camera unit 14. It can function in the following manner: the user draws a graphical object, such as a circle or a line, on a paper. The images are scanned in by camera 14a to memory unit 13 of the notebook computer and the user starts the graphics handler software using the keyboard or the mouse. The scanned picture of the graphical object is then shown on the display. The user can select a picture on the display and modify the object by means of the graphics handler application to look like a desired object, such as a regular circle.

The user can also select the character recognition software after the picture on the paper is scanned in the notebook computer by camera unit. 14. The character recognition software converts the hand written text into ASCII characters. Indistinct characters are guessed by the software or the user is asked for further information.

The simplest alternative is to store the information scanned in memory unit 13 of the mobile organiser by camera unit 14, in the form of a bitmap. This type of image information is used in facsimile/telefax transmission. The same kind of image storing can also be used for storing incoming telefax messages.

The telefax functions can be implemented in the following way: the user writes notes on a paper and the characters on the paper are scanned in memory unit 13 of the notebook computer by camera unit 14. The user selects the telefax application from the application programs and defines a receiver for the message. Next the picture of the notes is transmitted as a bitmap and a telefax message from the mobile organiser's memory unit via cellular mobile phone unit 17 comprising a telefax modem. Incoming telefax messages are received in a corresponding manner via cellular mobile phone 17 and stored in the mobile organiser's memory as bitmaps. After the picture is ready, it is output on display 9 of the mobile organiser by means of the telefax program. All the images stored in the mobile organiser's memory can be viewed on the display using an operating program which applies the said bitmap.

When a user interface based on camera unit 14 is integrated in connection with the notebook computer and especially its housing 1, obvious advantages are accomplished. With such camera unit 14 the user can scan different written and/or drawn information into the memory of the notebook computer quickly and easily. The use of camera unit 14 is faster and easier than writing with a pen, for instance. Information on business cards, as already mentioned, printed material and hand written notes, etc., can be scanned into the memory of the notebook computer by using camera unit 14.

Figure 7:
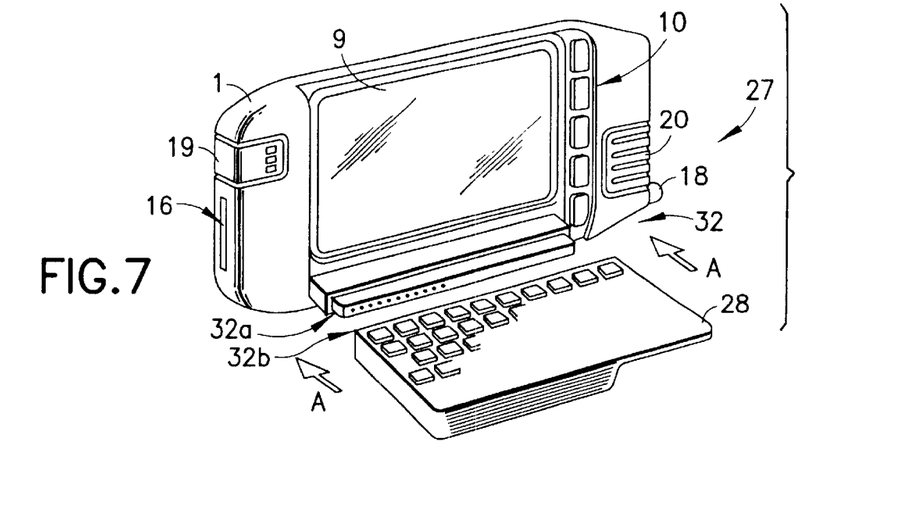
FIG. 7 shows a device according to the invention for personal communication, data collection and processing, comprising a replaceable keyboard.
Figure 8:
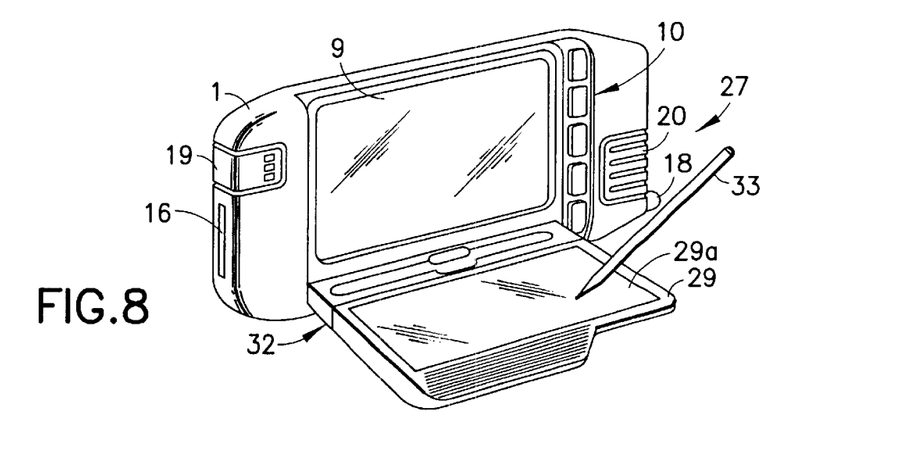
FIG. 8 shows a device according to FIG. 7, comprising a digitizer pad instead of the keyboard.
Figure 9:
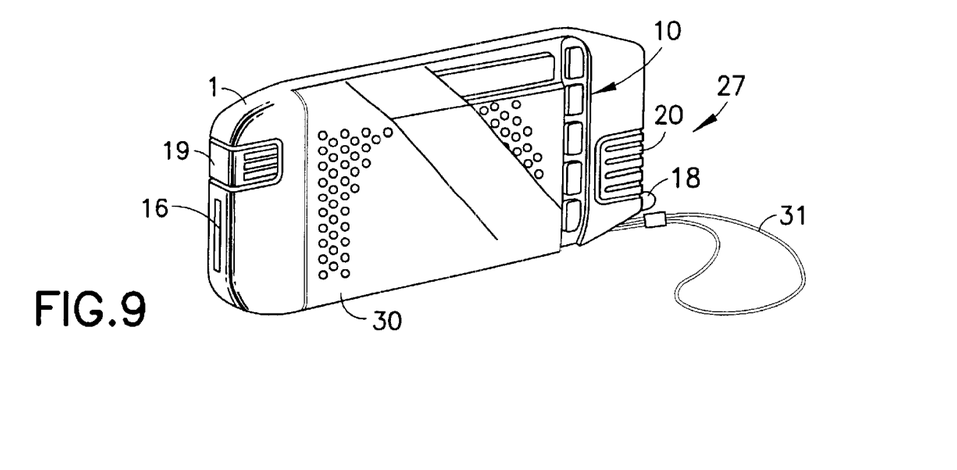
FIG. 9 shows the device of FIG. 7 when closed.

FIGS. 7 and 8 show a notebook computer 27 according to the invention, in which keyboard 28 for writing texts and digitizer pad 29 can be installed replaceably. FIG. 9 shows the notebook computer according to FIGS. 7 and 8 in which keyboard/digitizer pad 30 is turned against the display of the notebook computer and locked in its place. In this way it is easy to carry notebook computer 27 along and to even put it in the pocket. Alternatively, the notebook computer can be carried by wrist strap 31.

Notebook computer 27 comprises essentially the same parts and units as shown above in the embodiments according to FIGS. 1 or 2. Consequently, the parts of notebook computer 27 which are visible externally include housing 1, display 9, keyboard 10, miniature speaker 19 and microphone 20 as well as antenna 18 (cf. FIGS. 1 and 2 and the block diagram in FIG. 3).

The external keyboard 28 of notebook computer 27 is used for writing. In spite of the small size, keyboard 28 comprises all the necessary characters,, such as letters, numbers and a number of function keys. An advantage of such normal, external keyboard 28 is that the user is familiar with the keyboard itself and he/she can use it in a conventional way for writing and feeding texts to the notebook computer.

External keyboard 28 is connected to notebook computer 27 by means of connector 32. In the case of FIGS. 7 and 8, the male part 32a of connector 32 is in connection with housing 1 of the notebook computer, while the female connector part 32b is in connection with external keyboard 28. In addition, male part 32a of connector 32 is hinged to the lower part of display 9 or to the elongated side of housing 1, whereby it can be turned up by at least 90° with respect to the surface of the display so that the keyboard can be turned up to cover display 9, as shown in FIG. 9, for instance. The female connector parts 32b of keyboard 28 are pushed to male connector parts 32a in the direction of arrows A, as shown in FIG. 7, when the external keyboard is connected to notebook computer 27. Keyboard 28 is automatically connected to input/output controller 5 of notebook computer 27 and to data processing unit 2 (cf. FIG. 3).

Digitizer pad 29 can be used advantageously instead of the above-described keyboard 28 in connection with notebook computer 27, as illustrated in FIG. 8. A similar connector part 32b to that of external keyboard 28 is connected to digitizer pad 29, whereby digitizer pad 29 can be installed directly in place of external keyboard 28 in a corresponding manner, when external keyboard 28 is removed.

Digitizer pad 29 is based on a known technique. The user can write texts or draw figures on viewing screen 29a in the digitizer pad using pen 33, and digitizer pad 29 recognises the touch of pen 33 simultaneously and converts the drawn figure into a bitmap. The bitmap is shown on viewing screen 29a of the digitizer pad until the user accepts it. After this the accepted digitised image is to be displayed on display 9 of notebook computer 27. The functions of digitizer pad 29 include an erase function of the drawn figure, which can be implemented in a known manner in various ways. For instance, digitizer pad 29 can include a function key by means of which the mode of digitizer pad 29 can be converted from the drawing mode into the erase mode and back again. In the drawing mode, figures can be drawn on viewing screen 29a of the digitizer pad, while in the erase mode these figures can be removed in a desired way.

An advantage of digitizer pad 29 is that texts or figures can be written or drawn on it almost in the same way as on a piece of paper. It is easy to edit the drawn figures or texts into an appropriate form using the application programs included in notebook computer 27.

A text or a figure written or drawn on digitizer pad 29 of notebook computer 27 can be stored later as an image in memory unit 13 of the notebook computer or fed to the character/object recognition software for further processing. Hand written texts can be converted into ASCII texts by the character recognition software, and graphical characters can be converted easily in the same way as is done by the recognition software. The operating modes of these software are described above in connection with the camera unit.

The bitmap images or converted ASCII texts/graphics transferred to the memory from digitizer pad 29 of notebook computer 27 can be later forwarded via telefax or electronic mail services, as disclosed above in the description of the invention. The files stored in the memory of notebook computer 27 can also be edited by means of external keyboard 28 and/or digitizer pad 29.

The notebook computer according to the invention comprises a number of facilities and/or application programs, by means of which the possibilities of the notebook computer can be utilised effectively Such tools include, for instance: electronic calendar, phone list and note pad, fully integrated with each other and to the communications, data collection and data processing functions of the notebook computer. The services used most frequently include functions related to speech communications, telefax function, electronic mail, paging, data bank services and on-line information service connections. When transmitting electronic mail or telefax messages, the user can digitise the message on the display of the notebook computer and to simply select the recipient information from the phone list. The phone list is generally an application which offers an easy way to select the address information of the recipient for a chosen electronic contact as well as for a possible written letter. The user can input address information and telephone number information of different people in the memory of the notebook computer by means of the camera unit functioning as the data collection device and by means of suitable utility functions related to the camera unit. The address file may include different additional information, such as a telephone number, telefax number, e-mail address as well as other necessary information, In addition to the name and address. It depends on the application selected for the notebook computer, which information the user chooses from the phone list and connects to the message to be transmitted.

When cellular mobile phone unit 17 of the notebook computer and the related cellular mobile phone controller 8 are implemented as a digital GSM system, the user can transmit SMS messages (Short Message Service). The user writes the message to the notebook computer using the keyboard or a pen on the digitizer pad, or the message reading is read by the data collection device such as camera unit 14. After the message has been transmitted via a cellular mobile phone to a GSM short message centre, it is forwarded to the recipient. The recipient is chosen from the phone list or the user inputs it manually.

An electronic mail message is implemented in the same way as the SMS message above, but the electronic mail message may be longer.

A device in accordance with the invention may also be a radiotelephone comprising a microprocessor, a display, a user interface, a microphone, a speaker, and a camera unit.

It is possible to place other cards according to the PCMCIA standard into the PCMCIA card slot of the notebook computer. For instance, a hard disc, an additional memory and a PCMCIA radio module are viable. The PCMCIA radio module provides a possibility to use the notebook computer in all cellular mobile phone systems. In this case, only an appropriate radio module card is installed in the PCMCIA card slot.

The notebook computer can communicate with another personal computer via a serial and/or parallel port or via a PCMCIA interface. The interface between the notebook computer and another computer can be implemented by means of an infrared link or a cable connection. Infrared link 12 can be used for communication between the notebook computer and a PC or other peripheral devices. For instance, the writing of a file can be implemented so that the file is transferred to The printer by means of the Infrared link and then printed.

The invention is described above with reference to some preferred embodiments thereof, but it is obvious that the invention can be modified in various ways within the inventive idea defined by the appended claims.

What is claimed is:

1. A device for personal communication, data collection and data processing, which is a small-sized, portable and hand-held work station including a housing and comprising a data processing unit, a display, a user interface, a number of peripheral device interfaces, at least one memory unit; a power source, and application software, wherein the device also comprises:

a camera unit for obtaining and outputting image information comprising:
a camera for receiving image information; optics connected to said camera for passing said image information to the camera;
at least one memory unit for storing said image information; and
an output coupled to said data processing unit for outputting image information from said memory unit to the processing unit;
and wherein at least a portion of said camera unit is located within said housing, and
said data processing unit processes image information output by said camera unit, and
wherein said device further comprises means for transmitting image information processed by said processing unit to another location using a radio frequency channel.

2. A device according to claim 1, wherein said means for transmitting image information comprises a cellular mobile phone unit.

3. A device according to claim 2, wherein the cellular mobile phone unit comprises equipment required by speech communications, such as a microphone and a loudspeaker, wherein said equipment is fitted in the housing of the device.

4. A device according to claim 2, wherein the cellular mobile phone unit comprises a telefax modem.

5. A device according to claim 1, further comprising an infrared link for data transmission between external devices and the device.

6. A device according to claim 1, wherein the power source is a battery.

7. A device according to claim 1, wherein the camera is a semiconductor camera.

8. A device according to claim 1, wherein said camera unit further comprises means for processing image information from an image received by said camera and means for storing at least a portion of the processed image information in said at least one memory unit of said camera unit for later recall.

9. A device according to claim 1, further comprising a replaceable keyboard coupled to one of said number of peripheral device interfaces of the device.

10. A device according to claim 1, further comprising a digitizer pad adapted to couple to one of said number of peripheral device interfaces of the device.

11. A device according to claim 1, further comprising a replaceable keyboard and a digitizer pad adapted to couple to the device via a same physical and electrical interface.

12. A device according to claim 1, further comprising a manual user input interface adapted to be physically and electrically coupled to and decoupled from at least two types of user input device.

13. A device according to claim 12, wherein a first type of user input device is comprised of a keyboard, and wherein a second type of user input device is comprised of a digitizer pad.

14. A device according to claim 12, wherein said manual user input interface is rotatably attached to the housing of said device such that said user input device that is coupled to said device can be rotated.

15. A device according to claim 14, wherein said user input device can be rotated to cover the display of said device.

16. A device according to claim 1, wherein said means for transmitting image information comprise means for facsimile transmission of at least a portion of said image information.

17. A device according to claim 1, wherein said means for transmitting image information comprise means for transmission of at least a portion of said image information as a Short Message Service message.

18. A device according to claim 1, wherein the camera unit is located entirely within the housing of the device.

19. A device according to claim 1, further comprising means for performing a character recognition task on at least a portion of said image information.

20. A device according to claim 19, wherein said means for performing a character recognition task comprises an application program stored in said at least one memory unit of the device.

21. A device according to claim 20, wherein said application program is a business card handling application.

22. A device according to claim 1, further comprising means for modifying at least a portion of said image information.

23. A device according to claim 22, wherein said means for modifying at least a portion of said image information comprises a graphics handler application program.

24. A device for personal communication, data collection and data processing, which is a small-sized, portable and hand-held work station including a housing and comprising a data processing unit; a display; a user interface; a number of peripheral device interfaces; at least one memory unit; a power source; and an application software, wherein the device also comprises:

a camera unit for obtaining and outputting image information, said camera unit comprising:
a camera;
optics connected to said camera;
at least one memory unit;
an output coupled to said data processing unit such that said data processing unit processes image information output by said camera unit; at least a portion of said camera unit being located within said housing; and wherein said device further comprises:
means for transmitting image information processed by said processing unit to another location using a radio frequency channel; and
a replaceable keyboard and a digitizer pad which are both adapted to couple to a same physical and electrical interface to the device.

25. A circuit card, which can be fitted to a card slot of a device for personal communication, data collection and data processing, comprising a camera unit having at least a portion thereof integrated in the circuit card for obtaining and outputting image information, said camera unit comprising:

camera with optics connected thereto, an image processing unit for processing and outputting image information obtained by said camera for use with said device, and an output for coupling image information, processed and output by said image processing unit for use with said device, to means in said device for processing image information output by said camera unit for transmission to another location using a radio frequency channel.

26. A circuit card according to claim 25, wherein the camera is a semiconductor camera.

27. A circuit card according to claim 25, wherein the circuit card is a PCMCIA card, and wherein the card slot is a PCMCIA card slot.

28. A circuit card according to claim 27, wherein the circuit card has physical dimensions corresponding substantially with those of a standard PCMCIA card.

29. A portable radiotelephone comprising:
solid-state camera unit f or receiving image information,
a display for presenting image information received by the camera unit to a user,
a microprocessor adapted to control the operations of the camera unit and to process image information received by the camera unit, and
means for transmitting image information processed by said microprocessor from said radiotelephone to another location using a radio frequency channel, and
wherein the camera unit comprises:
a camera, and
means for processing and for storing at least a portion of the image information received by the camera unit for later recall and processing.

30. A device for personal communication, data collection and data processing, which is a small-sized, portable and hand-held work station comprising a data processing unit; a display; a user interface; a number of peripheral device interfaces; at least one memory unit; a power source; a card slot; and application software, wherein the device also comprises:

a circuit card electrically couplable to said card slot;

a camera unit for obtaining image information, including a camera (14a), optics (14b), and an output, and with at least a portion of the camera unit integrated in said circuit card that is electrically couplable to the card slot of the device, and wherein said data processing unit is coupled to said output for processing image information output by said camera unit (14) while said circuit card is electrically coupled to said card slot of said device, and means for transmitting image information processed by said data processing unit from said device to another location using a radio frequency channel.

31. A device according to claim 30, wherein the camera is a semiconductor camera.

32. A device according to claim 30, wherein the circuit card is a PCMCIA card, and wherein the card slot is a PCMCIA card slot.

33. A device according to claim 32, wherein the circuit card has physical dimensions corresponding substantially with those of a standard PCMCIA card.

34. A device according to claim 2, wherein the cellular mobile phone unit is for transmitting at least one of data and speech.

35. A device according to claim 30, wherein said camera unit is integrated completely into said circuit card.

36. A portable notebook computer having a housing, comprising:

a camera unit for recording an image of a selected object, and having at least one memory unit for storing an image recorded by said camera unit;

means, coupled to said camera unit, for processing an image recorded by said camera unit, and means for transmitting an image processed by said processing means to another location using a radio frequency channel;

wherein at least a portion of said camera unit is integrated in one of said housing of said notebook computer and a circuit card.

37. A portable notebook computer according to claim 36, wherein said camera unit further comprises means for performing character recognition of characters appearing in an image recorded by said camera unit.

38. A portable notebook computer according to claim 36, further comprising means, coupled to said processing means, for displaying at least a portion of an image recorded by said camera unit.

39. A portable notebook computer according to claim 38, further comprising: means for selectively modifying an image appearing on said display.

40. A portable notebook computer according to claim 36, wherein said transmitting means comprises means for transmitting a facsimile transmission of at least a portion of an image processed by said processing means.

41. A portable notebook computer according to claim 36, further comprising:

means, coupled to said processing means, for receiving a facsimile from a transmitting station.

42. A portable notebook computer according to claim 36, further comprising means for performing at least one of transmitting an electronic mail message, paging, and connecting to an on-line information service.

43. A portable notebook computer according to claim 36, wherein the circuit card is a PCMCIA card.

44. A portable notebook computer according to claim 43, wherein in the PCMCIA card has physical dimensions corresponding substantially with those of a standard PCMCIA card.

45. A portable notebook computer according to claim 36, further comprising means for transmitting a Short Message Service (SMS) message including at least a portion of an image taken by said camera unit.

46. A portable notebook computer according to claim 36, wherein said camera unit is located entirely within the housing of the portable notebook computer.

47. A portable notebook computer according to claim 36, wherein said camera unit is integrated completely within said circuit card.

48. A portable notebook computer according to claim 36, further comprising means for performing character recognition of characters appearing in an image recorded by said camera unit.

49. A portable notebook computer according to claim 36, further comprising a digitizer pad that is removably coupled to said portable notebook computer via an electrical and mechanical interface such that it can be replaced with another type of manual input device.

50. A portable notebook computer according to claim 36, further comprising a keyboard that is removably coupled to said portable notebook computer via an electrical and mechanical interface such that it can be replaced with another type of manual input device.

51. A portable notebook computer according to claim 36, further comprising a removable keyboard and a digitizer pad that are both coupled to a same electrical and mechanical interface of the portable notebook computer.

52. A portable notebook computer according to claim 36, further comprising an infrared link for data transmission between the portable notebook computer and an external device.

53. A portable notebook computer having a housing, comprising:

a camera unit for recording an image of a selected object, and having at least one memory unit for storing an image recorded by said camera unit;

means, coupled to said camera unit, for processing an image recorded by said camera unit; and means for transmitting an image processed by said processing means to another location using a radio frequency channel;

wherein at least a portion of said camera unit is integrated in one of said housing of said notebook computer and a circuit card; and further comprising a digitizer pad that is removably coupled to said processing means such that it can be replaced with another type of manual input device.

54. A method for recording and processing an image of a selected object using a portable notebook computer, the notebook computer having a data processing unit, a facsimile transmitting unit, a housing, and a card slot, comprising the steps of:

integrating a camera unit that is electrically coupled to the data processing unit, in one of said housing of the notebook computer and a circuit card that is fitted into said card slot of the notebook computer, operating the camera unit to record an image of the selected object; and storing and processing the image recorded by the camera unit to perform character recognition of characters appearing in at least a portion of the recorded image; and using the facsimile transmitting unit to transmit a facsimile representation of at least a portion of the recorded image to another location using a radio frequency channel.

55. A portable computer device, comprising:

a data processor coupled to a memory;

an electronic camera unit that is detachably coupled to the data processor through a plug-in interface, said electronic camera unit comprising a solid state camera, a second data processor and a second memory, said second data processor being operable for performing at least a character recognition task on an image obtained by said solid state camera unit to generate a set of recognized characters; and a radio transceiver unit coupled to said data processor for transmitting data to a remote receiver through a radio frequency channel, said transmitted data comprising at least one of processed image data obtained from said electronic camera unit or at least a portion of said set of recognized characters.

56. A portable computer device according to claim 55, further comprising a display for displaying at least a portion of an image recorded by said electronic camera unit, and wherein said data processor is responsive to a program stored in said memory and to a user input for selectively modifying a displayed image.

57. A portable computer device according to claim 55, further comprising a manual user input interface adapted to be physically and electrically coupled to and decoupled from one of at least two types of user input device, wherein a first type of user input device is comprised of a keyboard, and wherein a second type of user input device is comprised of a digitizer pad.

58. A portable computer device according to claim 57, further comprising a display for displaying information to a user, and wherein said manual user input interface is rotatably attached to a housing of said portable computer device such that said user input device that is coupled to said computer device can be rotated so as cover said display.

59. A portable computer device according to claim 55, further comprising a manual user input interface adapted to be physically and electrically coupled to and decoupled from one of at least two types of user input device.

60. A portable computer device according to claim 59, wherein a first type of user input device is comprised of a keyboard, and wherein a second type of user input device is comprised of a digitizer pad.

61. A device for personal communication, data collection and processing, comprising:

a small-sized, portable and hand-held work station;

a housing for said work station;

a data processing unit;

a display;

a user interface;

a number of peripheral device interfaces;

at least one memory unit;

a power source; and application software;

and further comprising:

means, coupled to said data processing unit, for transmitting image information processed by said data processing unit to another location using a radio frequency channel; and a camera card for obtaining image information, comprising:

optics integrated in said camera card for obtaining said image information;

at least one memory unit;

a processor unit for processing said image information; and an image sensor for obtaining said image information;

and wherein said camera card is at least partially inserted in the device.

62. A device according to claim 61, further comprising a digitizer pad that is removably coupled to one of said number of peripheral device interfaces such that it can be replaced with another type of manual input device.

63. A device according to claim 61, further comprising a keyboard that is removably coupled to one of said number of peripheral device interfaces such that it can be replaced with another type of manual input device.

64. A device according to claim 61, further comprising means for performing a character recognition task on an image obtained by said camera card for generating a set of recognized characters.

65. A device for personal communication and data collection and processing, comprising:

a small-sized, portable and hand-held work station;

a housing for said work station;

a data processing unit;

a display;

a user interface;

a number of peripheral device interfaces;

at least one memory unit;

a power source; and application software;

and further comprising:

a cellular mobile phone unit, coupled to said data processing unit, for transmitting image information processed by said data processing unit to another location; and a camera card for obtaining image information, comprising:

optics integrated in said camera card for obtaining said image information;

at least one memory unit;

a processor unit for processing said image information; and an image sensor for obtaining said image information;

and wherein said camera card is at least partially inserted in the device.

66. A device according to claim 65, further comprising a digitizer pad that is removably coupled to one of said number of peripheral device interfaces such that it can be replaced with another type of manual input device.

67. A device according to claim 65, further comprising a keyboard that is removably coupled to one of said number of peripheral device interfaces such that it can be replaced with another type of manual input device.

68. A device according to claim 65, further comprising means for performing a character recognition task on an image obtained by said camera card for generating a set of recognized characters.

69. A device for personal communication, data collection and data processing, which is a small-sized, portable and hand-held work station with a housing, comprising:

a data processing unit;

a display;

a user interface;

a number of peripheral device interfaces;

at least one memory unit;

a power source; and application software;

wherein the device also comprises:

means, coupled to said data processing unit, for transmitting image information processed by said data processing unit to another location using a radio frequency channel; and a camera unit for obtaining image information, said camera unit comprising:

optics for obtaining image information;

an image sensor for obtaining image information, said image sensor being located within the housing of the device; and a processor within said camera unit for processing obtained images, said processor being located within the housing of the device.

70. A device according to claim 69, further comprising a digitizer pad that is removably coupled to one of said number of peripheral device interfaces such that it can be replaced with another type of manual input device.

71. A device according to claim 69, further comprising a keyboard that is removably coupled to one of said number of peripheral device interfaces such that it can be replaced with another type of manual input device.

72. A device according to claim 69, further comprising means for performing a character recognition task on an image obtained by said camera unit for generating a set of recognized characters.

73. A portable cellular mobile phone comprising:

a built in camera unit for obtaining image information;

a user interface for enabling a user to input signals to operate the camera unit;

a display for presenting image information obtained by the camera unit;

a microprocessor adapted to control the operations of the camera unit in response to input signals from the user interface, and to process image information received by the camera unit; and means, coupled to said microprocessor, for transmitting image information processed by said microprocessor to another location using a radio frequency channel;

and wherein the camera unit comprises:

optics for obtaining image information;

an image sensor for obtaining image information; and means for processing and for storing at least a portion of the image information obtained by the camera unit for later recall and processing.

74. A portable cellular mobile phone according to claim 73, further comprising a number of peripheral device interfaces, and a digitizer pad that is removably coupled to one of said number of peripheral device interfaces such that it can be replaced with another type of manual input device.

75. A portable cellular mobile phone according to claim 73, further comprising a number of peripheral device interfaces, and a keyboard that is removably coupled to one of said number of peripheral device interfaces such that it can be replaced with another type of manual input device.

76. A portable cellular mobile phone according to claim 73, further comprising means for performing a character recognition task on an image obtained by said camera unit for generating a set of recognized characters.

* * * * *

UNITED STATES PATENT AND TRADEMARK OFFICE
CERTIFICATE OF CORRECTION

PATENT NO. : 6,427,078 B1
DATED : July 30, 2002
INVENTOR(S) : Kari-Pekka Wilska, Reijo Paajanen, Mikko Terho and Jari Hamalainen It is certified that error appears in the above-identified patent and that said Letters Patent is hereby corrected as shown below:

Title page,
Item [30], Foreign Application Priority Data,
"Jun. 12, 1995 (FI)..............942334" should read
-- May 19, 1994 (FI)...............942334 --.

Column 10,
Line 31, please insert -- , said camera unit -- after "card".
Line 41, please insert -- and means -- after "unit".
Line 52, please insert -- a -- before "solid-state".
Line 52, "f or" should read -- for --.

Column 11,
Line 8, please delete "(14a)" after "camera".
Line 8, please delete "(14b)" after "optics".
Line 13, please delete "(14)" after "unit".

Column 12,
Line 8, "further comprising" should read -- wherein said transmitting means comprises --.
Line 10, "taken by said camera unit" should read -- processed by said processing means --.

Signed and Sealed this

First Day of April, 2003

JAMES E. ROGAN
*Director of the United States Patent and Trademark Office*

(12) EX PARTE REEXAMINATION CERTIFICATE (9274th)
United States Patent
Wilska et al.

(10) Number: US 6,427,078 C1
(45) Certificate Issued: Sep. 4, 2012

(54) DEVICE FOR PERSONAL COMMUNICATIONS, DATA COLLECTION AND DATA PROCESSING, AND A CIRCUIT CARD

(75) Inventors: Kari-Pekka Wilska, Salo (FI); Reijo Paajanen, Tampere (FI); Mikko Terho, Tampere (FI); Jari Hamalainen, Tampere (FI)

(73) Assignee: Mobilemedia Ideas LLC, Chevy Chase, MD (US)

Reexamination Request:
No. 90/011,736, Jun. 10, 2011
No. 90/011,883, Aug. 30, 2011

Reexamination Certificate for:
Patent No.: 6,427,078
Issued: Jul. 30, 2002
Appl. No.: 08/807,322
Filed: Feb. 27, 1997

Certificate of Correction issued Apr. 1, 2003.

Related U.S. Application Data

(63) Continuation of application No. 08/444,224, filed on May 18, 1995, now abandoned.

(30) Foreign Application Priority Data

May 19, 1994 (FI) .................................................. 942334

(51) Int. Cl.
*G06F 1/16* (2006.01)
*H04M 1/72* (2006.01)
*H04M 1/247* (2006.01)
*H04M 1/02* (2006.01)
*H04N 1/00* (2006.01)
*H04N 1/21* (2006.01)
*H04Q 3/00* (2006.01)

(52) U.S. Cl. ............. 455/550.1; 348/14.02; 348/231.99; 348/552; 455/556.1; 455/556.2; 455/557; 455/558

(58) Field of Classification Search ........................ None
See application file for complete search history.

(56) References Cited

To view the complete listing of prior art documents cited during the proceedings for Reexamination Control Numbers 90/011,736 and 90/011,883 please refer to the USPTO's public Patent Application Information Retrieval (PAIR) system under the Display References tab.

*Primary Examiner* — Roland Foster (57) ABSTRACT

The object of the invention is a device for personal communication, data collection and data processing, which is a small-sized, portable and hand-held work station comprising a data processing unit (2); a display (9); a user interface (10, 11); a number of peripheral device interfaces (12, 17); at least one memory unit (13); a power source, preferably a battery (3); and an application software. According to the invention the device also comprises a camera unit (14). The camera unit (14) comprises a camera (14a), preferably a semiconductor camera, and optics (14b) connected thereto, which are placed in the housing (1) of the device. Alternatively, the camera unit (14) is fitted on a PCMCIA card (15) which can be connected to the PCMCIA card slot (16) of the device. An object of the invention is also a PCMCIA card (15) provided with a camera unit (14).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 73 is confirmed.

Claims 8, 29 and 69 are cancelled.

Claims 1 and 17 are determined to be patentable as amended.

Claims 2, 3, 5, 6, 18 and 34 dependent, on an amended claim, are determined to be patentable.

New claims 77-79 are added and determined to be patentable.

Claims 4, 7, 9-16, 19-28, 30-33, 35-68, 70-72 and 74-76 were not reexamined.

1. A [device] *portable cellular mobile phone* for personal communication, data collection and data processing, which is a small-sized, portable and hand-held work station including a housing and comprising
   a data processing unit *comprising a microprocessor*,
   a display,
   a user interface,
   a number of peripheral device interfaces,
   at least one memory unit;
   a power source, and
   application software,
   wherein the device also comprises:
   a camera unit for obtaining and outputting image information comprising:
   a camera for receiving image information;
   optics connected to said camera for passing said image information to the camera;
   *means for processing and for storing at least a portion of said image information obtained by said camera unit for later recall and processing;*
   at least one memory unit for storing said image information; and
   an output coupled to said data processing unit for outputting image information from said memory unit to the processing unit; and
   wherein at least a portion of said camera unit is located within said housing, and said data processing unit processes image information output by said camera unit,
   *wherein said display presents image information obtained by said camera unit,* and
   wherein said device further comprises means for transmitting image information processed by said processing unit to another location using a radio frequency channel.

17. [A device according to claim 1.] *A device for personal communication, data collection and data processing, which is a small-sized, portable and hand-held work station including a housing and comprising a data processing unit, a display, a user interface, a number of peripheral device interfaces, at least one memory unit; a power source, and application software, wherein the device also comprises: a camera unit for obtaining and outputting image information comprising: a camera for receiving image information; optics connected to said camera for passing said image information to the camera; at least one memory unit for storing said image information; and an output coupled to said data processing unit for outputting image information from said memory unit to the processing unit; and wherein at least a portion of said camera unit is located within said housing, and said data processing unit processes image information output by said camera unit, and wherein said device further comprises means for transmitting image information processed by said processing unit to another location using a radio frequency channel,* wherein said means for transmitting image information comprise means for transmission of at least a portion of said image information as a Short Message Service message.

*77. The portable cellular mobile phone of claim 73, wherein the means for transmitting image information transmits the image information processed by said microprocessor to another location by transmitting an electronic mail message.*

*78. The portable cellular mobile phone of claim 73, wherein the image information obtained by the camera unit depicts data presented on paper.*

*79. The portable cellular mobile phone of claim 73, wherein the image information obtained by the camera unit depicts an image of a person.*

* * * * *

(12) EX PARTE REEXAMINATION CERTIFICATE (9893rd)
United States Patent
Wilska et al.

(10) Number: US 6,427,078 C2
(45) Certificate Issued: Oct. 21, 2013

(54) DEVICE FOR PERSONAL COMMUNICATIONS, DATA COLLECTION AND DATA PROCESSING, AND A CIRCUIT CARD

(75) Inventors: Kari-Pekka Wilska, Salo (FI); Reijo Paajanen, Tampere (FI); Mikko Terho, Tampere (FI); Jari Hamalainen, Tampere (FI)

(73) Assignee: Mobilemedia Ideas LLC, Chevy Chase, MD (US)

Reexamination Request:
No. 90/012,637, Sep. 14, 2012

Reexamination Certificate for:
Patent No.: 6,427,078
Issued: Jul. 30, 2002
Appl. No.: 08/807,322
Filed: Feb. 27, 1997

Reexamination Certificate C1 6,427,078 issued Sep. 4, 2012

Certificate of Correction issued Apr. 1, 2003

Related U.S. Application Data

(63) Continuation of application No. 08/444,224, filed on May 18, 1995, now abandoned.

(30) Foreign Application Priority Data

May 19, 1994 (FI) .......................................... 942334

(51) Int. Cl.
*G06F 1/16* (2006.01)

(52) U.S. Cl.
USPC ................ 455/550.1; 348/14.02; 348/231.99; 348/552; 455/556.1; 455/556.2; 455/557; 455/558

(58) Field of Classification Search
None
See application file for complete search history.

(56) References Cited

To view the complete listing of prior art documents cited during the proceeding for Reexamination Control Number 90/012,637, please refer to the USPTO's public Patent Application Information Retrieval (PAIR) system under the Display References tab.

*Primary Examiner* — Luke S Wassum (57) ABSTRACT

The object of the invention is a device for personal communication, data collection and data processing, which is a small-sized, portable and hand-held work station comprising a data processing unit (2); a display (9); a user interface (10, 11); a number of peripheral device interfaces (12, 17); at least one memory unit (13); a power source, preferably a battery (3); and an application software. According to the invention the device also comprises a camera unit (14). The camera unit (14) comprises a camera (14a), preferably a semiconductor camera, and optics (14b) connected thereto, which are placed in the housing (1) of the device. Alternatively, the camera unit (14) is fitted on a PCMCIA card (15) which can be connected to the PCMCIA card slot (16) of the device. An object of the invention is also a PCMCIA card (15) provided with a camera unit (14).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3, 5, 6, 18, 34, 73 and 77-79 is confirmed.

Claims 8, 29 and 69 were previously cancelled.

Claims 4, 7, 9-17, 19-28, 30-33, 35-68, 70-72 and 74-76 were not reexamined.

* * * * *

(12) EX PARTE REEXAMINATION CERTIFICATE (10364th)
United States Patent
Wilska et al.

(10) Number: US 6,427,078 C3
(45) Certificate Issued: Oct. 24, 2014

(54) DEVICE FOR PERSONAL COMMUNICATIONS, DATA COLLECTION AND DATA PROCESSING, AND A CIRCUIT CARD

(75) Inventors: Kari-Pekka Wilska, Salo (FI); Reijo Paajanen, Tampere (FI); Mikko Terho, Tampere (FI); Jari Hamalainen, Tampere (FI)

(73) Assignee: Mobilemedia Ideas LLC, Chevy Chase, MD (US)

Reexamination Request:
No. 90/012,952, Aug. 14, 2013

Reexamination Certificate for:
Patent No.: 6,427,078
Issued: Jul. 30, 2002
Appl. No.: 08/807,322
Filed: Feb. 27, 1997

Reexamination Certificate C1 6,427,078 issued Sep. 4, 2012

Reexamination Certificate C2 6,427,078 issued Oct. 21, 2013

Certificate of Correction issued Apr. 1, 2003

Related U.S. Application Data

(63) Continuation of application No. 08/444,224, filed on May 18, 1995, now abandoned.

(30) Foreign Application Priority Data

May 19, 1994 (FI) .......................................... 942334

(51) Int. Cl.
*G06F 1/16* (2006.01)

(52) U.S. Cl.
USPC ................ 455/550.1; 348/14.02; 348/231.99; 348/552; 455/556.1; 455/556.2; 455/557; 455/558

(58) Field of Classification Search
None
See application file for complete search history.

(56) References Cited

To view the complete listing of prior art documents cited during the proceeding for Reexamination Control Number 90/012,952, please refer to the USPTO's public Patent Application Information Retrieval (PAIR) system under the Display References tab.

*Primary Examiner* — Luke S Wassum (57) ABSTRACT

The object of the invention is a device for personal communication, data collection and data processing, which is a small-sized, portable and hand-held work station comprising a data processing unit (2); a display (9); a user interface (10, 11); a number of peripheral device interfaces (12, 17); at least one memory unit (13); a power source, preferably a battery (3); and an application software. According to the invention the device also comprises a camera unit (14). The camera unit (14) comprises a camera (14a), preferably a semiconductor camera, and optics (14b) connected thereto, which are placed in the housing (1) of the device. Alternatively, the camera unit (14) is fitted on a PCMCIA card (15) which can be connected to the PCMCIA card slot (16) of the device. An object of the invention is also a PCMCIA card (15) provided with a camera unit (14).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 73 is confirmed.

Claims 8, 29 and 69 were previously cancelled.

Claims 1-7, 9-28, 30-68, 70-72 and 74-79 were not reexamined.

* * * * *